United States Patent
Cardillo et al.

(10) Patent No.: US 9,970,615 B1
(45) Date of Patent: May 15, 2018

(54) LIGHT-BASED VEHICLE-DEVICE COMMUNICATIONS

(71) Applicant: Ford Global Technologies, LLC, Dearborn, MI (US)

(72) Inventors: John Cardillo, Windsor (CA); Sushanta Das, Ann Arbor, MI (US); Ivan Vukovic, Arlington Heights, IL (US); Samer Ibrahim, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/602,322

(22) Filed: May 23, 2017

(51) Int. Cl.
| | |
|---|---|
| *B60Q 1/00* | (2006.01) |
| *F21S 8/10* | (2006.01) |
| *G08G 1/123* | (2006.01) |
| *G08G 1/00* | (2006.01) |
| *F21K 9/00* | (2016.01) |
| *H05B 33/02* | (2006.01) |
| *F21Y 115/10* | (2016.01) |

(52) U.S. Cl.
CPC ............... *F21S 43/14* (2018.01); *F21K 9/00* (2013.01); *F21S 43/10* (2018.01); *F21S 48/21* (2013.01); *F21S 48/215* (2013.01); *G08G 1/123* (2013.01); *G08G 1/20* (2013.01); *H05B 33/02* (2013.01); *F21Y 2115/10* (2016.08)

(58) Field of Classification Search
CPC ........................................................ B60Q 1/482
USPC ....... 340/482, 425.5, 426.13, 426.16, 426.22
See application file for complete search history.

(56) References Cited

U.S. PATENT DOCUMENTS

| | | | |
|---|---|---|---|
| 8,638,205 B2 * | 1/2014 | Boehme | E05F 15/43 340/425.5 |
| 8,768,565 B2 | 7/2014 | Jefferies et al. | |
| 9,547,985 B2 | 1/2017 | Tuukkanen | |
| 2014/0278607 A1 | 9/2014 | Johnson et al. | |
| 2015/0339928 A1 | 11/2015 | Ramanujam | |
| 2016/0082880 A1 * | 3/2016 | Co | B60Q 1/2611 701/2 |
| 2016/0227634 A1 | 8/2016 | Engelen et al. | |
| 2017/0120904 A1 * | 5/2017 | Kentley | B60W 30/09 |

FOREIGN PATENT DOCUMENTS

| | | |
|---|---|---|
| WO | WO 2016000014 A1 | 1/2016 |
| WO | WO 2016138517 A1 | 9/2016 |

* cited by examiner

*Primary Examiner* — Kevin Kim
(74) *Attorney, Agent, or Firm* — Frank A. MacKenzie; Bejin Bieneman PLC (57) ABSTRACT

A system for light-based vehicle-device communication includes a computer programmed to generate a first light pattern based on a received identifier, actuate a vehicle light according to the first light pattern, and then identify, from received image data, a second light pattern emitted from outside of the vehicle. The system may further include a mobile computing device programmed to generate the second light pattern based on a received vehicle identifier, and actuate a mobile device light according to the second light pattern. The mobile computing device may be programmed to identify, from received image data, the first light pattern.

20 Claims, 5 Drawing Sheets

LIGHT-BASED VEHICLE-DEVICE COMMUNICATIONS

BACKGROUND

Both human-operated and autonomous vehicles may be used to provide transportation services. A user may arrange for a vehicle to pick up the user at a specified location. However, the user may not recognize the vehicle and/or the vehicle (or operator thereof) may not recognize the user. Likewise, the user and/or vehicle (or operator thereof) may have a general specification of the other's location, e.g., a parking lot, a given city block, etc., but may lack further ability to identify the other's location, and to complete a rendezvous. Such issues are not limited to, but can pertain particularly, to crowded or congested areas such as transportation hubs or venues where numerous users are looking to identify a pick up vehicle which may be in long lines of awaiting vehicles; current approaches to visual or other sensor identification, for example, can be insufficient. Moreover, there are problems with existing communications between user devices and vehicle computing devices. For example, communications via a network, such as a cellular network or the like, can be subject to latency and/or otherwise generally unreliable. Other existing communications mechanisms, especially RF (radio frequency) communications carried out by protocols such as BLUETOOTH® and the like, can be difficult to establish and/or otherwise unreliable. In addition, especially when finer resolutions are called for, Global Positioning System (GPS) technology may prove unreliable or inaccurate.

DETAILED DESCRIPTION

Introduction

A solution to the problem of inadequate communications between a vehicle and a user include a computer in the vehicle and a mobile device (e.g., a smartphone or the like) each programmed to detect (a) light pattern(s) emitted by the other, and then to identify the other according to the detected light pattern(s). Light sources can include vehicle headlights, mobile device camera lights, etc. Sensors, typically vehicle and user device cameras detect the light patterns. Detected light patterns can then be used to confirm that a source of the light pattern is a user to be picked up or a vehicle to perform the pickup, and to determine, and indicate to a user, a relative location of the source, e.g., a vehicle that is provided to pick up the user.

In one possible approach, the system includes a computer programmed to generate a first light pattern based on a received identifier, actuate a vehicle light according to the first light pattern, and then identify, from received image data, a second light pattern emitted from outside of the vehicle. The computer may be programmed to determine a mobile device location based on the identified second light pattern, and output the mobile device location to a vehicle user interface. The computer may be programmed to actuate at least one vehicle component upon identifying the second light pattern. The computer may be programmed to determine a path to a mobile device based on the identified second light pattern, and at least one of output the path to a vehicle user interface and actuate the vehicle to move based on the path. The computer may be programmed to determine a distance to the mobile device associated with the identifier, and actuate the vehicle light upon determining that the distance is less than a predetermined threshold.

The system may further include a mobile computing device programmed to generate the second light pattern based on a received vehicle identifier, and actuate a mobile device light according to the second light pattern. The mobile computing device may be programmed to identify, from received image data, the first light pattern, and based on the first light pattern, identify the vehicle in a display of the mobile device. In addition, or in the alternative, before identifying the first light pattern from the received image data, use the received image data to predict the identity of the vehicle based on visual vehicle attributes. The mobile computing device may be programmed to determine a distance to the vehicle, and actuate the mobile device light upon determining that the distance to the vehicle is less than the predetermined threshold.

An example method includes generating a first light pattern based on a received identifier, actuating a vehicle light according to the first light pattern, and then identifying, from received image data, a second light pattern emitted from outside of the vehicle.

The method may further include determining a mobile device location based on the identified second light pattern, and outputting the mobile device location to a vehicle user interface. In some instances, the method includes actuating at least one vehicle component upon identifying the second light pattern. In some possible implementations, the method includes determining a path to a mobile device based on the identified second light pattern, and at least one of outputting the path to a vehicle user interface and actuating the vehicle to move based on the path. Alternatively or in addition, the method may include determining a distance to a mobile device associated with the identifier, and actuating the vehicle light upon determining that the distance is less than a predetermined threshold.

The method may further include generating the second light pattern based on a received vehicle identifier, and actuating a mobile device light according to the second light pattern. In some instances, the method includes identifying, from received image data, the first light pattern. Based on the first light pattern, the method may further include identifying the vehicle in a display of a mobile device. In some possible implementations, before identifying the first light pattern from the received image data, the method may include using the received image data to predict the identity of the vehicle based on visual vehicle attributes. Alternatively or in addition, the method may include determining a distance to the vehicle, and actuating the mobile device light upon determining that the distance to the vehicle is less than a predetermined threshold.

Exemplary System Elements

Figure 1:
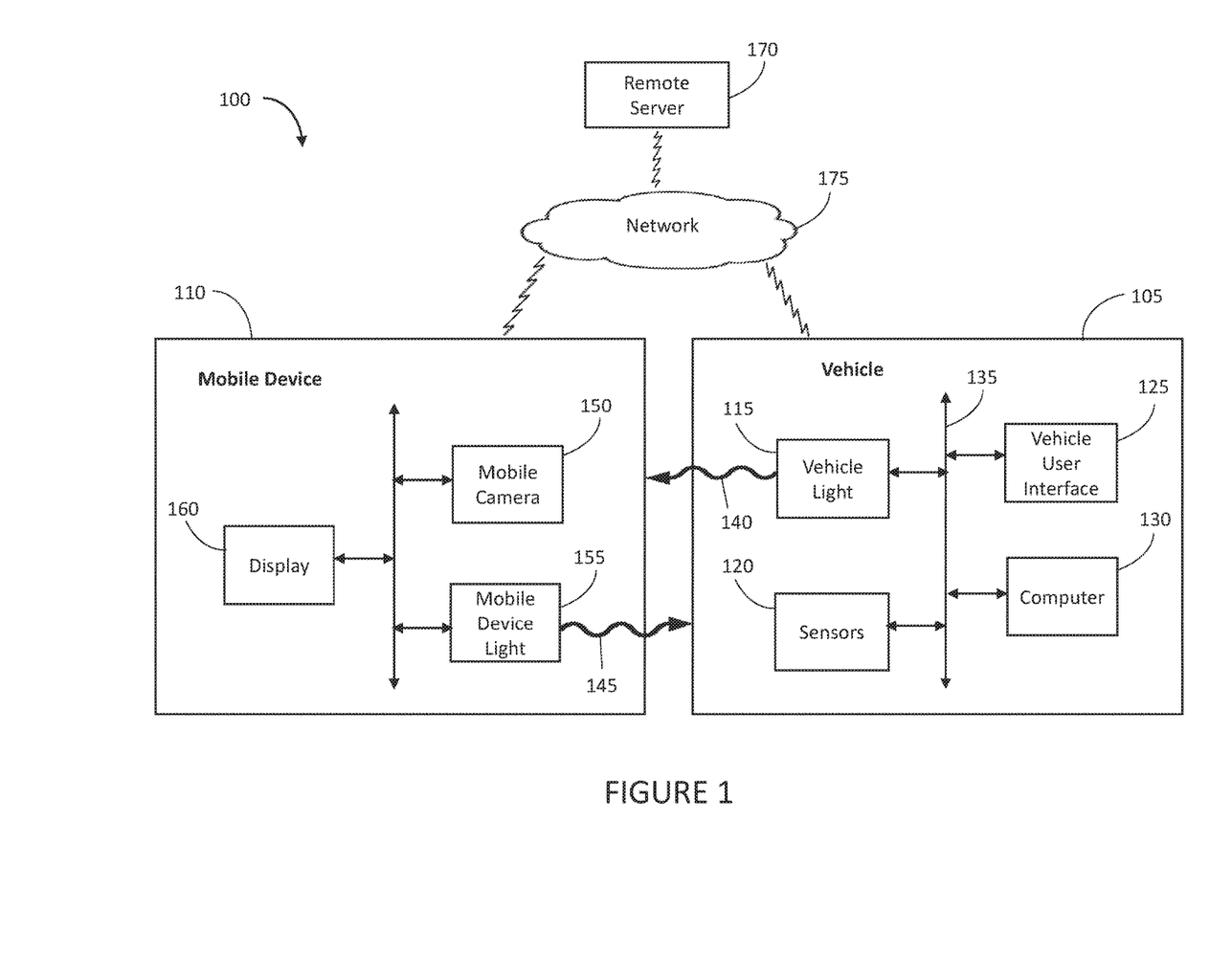
FIG. 1 is a block diagram of an exemplary system for mutual identification of a mobile device and a vehicle

FIG. 1 illustrates of an exemplary system 100 for vehicle 105 and mobile device 110 communication and identification. The mobile device 110 may be, for example, a smart phone or tablet, a laptop computer, a smart wearable, etc. The vehicle 105 may include any passenger or commercial automobile such as a car, a truck, a sport utility vehicle, a crossover vehicle, a van, a minivan, a taxi, a bus, etc. When the computer 130 operates the vehicle 105, the vehicle 105 is an "autonomous" vehicle 105. For purposes of this disclosure, the term "autonomous vehicle" is used to refer to a vehicle 105 operating in a fully autonomous mode. A fully autonomous mode is defined as one in which each of vehicle 105 propulsion (typically via a powertrain including an electric motor and/or internal combustion engine), braking, and steering are controlled by the computer 130 and not a human operator. A semi-autonomous mode is one in which at least one of vehicle 105 propulsion (typically via a powertrain including an electric motor and/or internal combustion engine), braking, and steering are controlled at least partly by the computer 130 as opposed to a human operator.

The components of the vehicle 105 include a vehicle light 115, sensors 120, a vehicle user interface 125, and a computer 130. These components are typically in communication with one another via a vehicle communication network 135. The vehicle communication network 135 includes hardware, such as a communication bus, for facilitating communication among these and possibly other components of the exemplary system 100, vehicle 105, or both. The vehicle communication network 135 may facilitate wired or wireless communication among the vehicle 105 components in accordance with a number of communication protocols such as controller area network (CAN), Ethernet, WiFi, Local Interconnect Network (LIN), and/or other wired or wireless mechanisms.

The vehicle light 115 is implemented via one or more light emitting diodes (or other suitable light source) that illuminate regions outside of the vehicle 105. The vehicle light 115 may illuminate in response to an illumination command output by the computer 130. In some instances, the vehicle light 115 may be controlled by a computing device, e.g., an electronic controller such as body control module (BCM), a lighting module, etc., and the vehicle light 115 may be illuminated by the device in response to the illumination command output by the computer 130 via the vehicle communication network 135. The vehicle light 115 may be part of a vehicle headlight assembly, a vehicle taillight assembly, or a center high mounted stop lamp (CHMSL) assembly. In other instances, the vehicle light 115 may be part of a light assembly mounted to an exterior of the vehicle 105, e.g., a spotlight assembly, a running light assembly, etc. In some implementations, one or more vehicle lights 115 may collectively be used as a light source to shine light from the vehicle 105 in a light beam. For instance, if the vehicle light 115 is implemented via the headlight, the vehicle light 115 may shine from a front of the vehicle 105 in a narrow beam. Some types of vehicle lights 115 allow for higher frequency light patterns than others. For example, light emitting diodes are advantageous in this regard compared to incandescent bulbs.

The sensors 120 are implemented are implemented via circuits, chips, or other electronic components that are programmed to collect data related to the vehicle 105 and the environment in which the vehicle 105 is operating. By way of example, and not limitation, sensors 120 may include, e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 120 may be used to sense the environment in which the vehicle 105 is operating, such as weather conditions, the grade of a road, the location of a road, neighboring vehicles, traffic conditions, traffic control signs, etc. The sensors 120 may further be used to collect vehicle data related to operations of the vehicle 105 such velocity, yaw rate, steering angle, engine speed, brake pressure, oil pressure, connectivity between components, etc. The sensors 120 may be further programmed to output the data collected to the computer 130.

One or more sensors 120 may be used to capture images of light patterns emitted from outside of the vehicle 105. For example, camera sensors 120 may capture images in an area around the exterior of the vehicle 105, e.g., in front of or behind the vehicle 105, in a hemispherical region on a side of the vehicle 105, etc. To capture such images, the camera sensors 120 may include a lens that projects light toward, e.g., a CCD image sensor, a CMOS image sensor, etc. Based on received image data, the computer 130 may identify a light pattern emitted from the mobile device 110, as explained further below. As another example, sensors 120, such as a door switch sensor, a seat occupancy sensor, or an occupant proximity sensor may detect that a user 190 has either opened a door of the vehicle 105, or is within the vehicle 105. These types of sensors may provide data to the computer 130 indicating that the user 190 has located the vehicle 105, and/or is seated in the vehicle 105.

The vehicle user interface 125 is implemented via circuits, chips, or other electronic components that received user inputs from inside the vehicle 105, and present information, such as alerts or information associated with the exemplary system 100. The vehicle user interface 125 may include a display screen, including a touch-sensitive display screen, real or virtual buttons, a microphone, speakers, etc. In some possible approaches, the vehicle user interface 125 is incorporated into a vehicle infotainment system. The vehicle user interface 125 may be programmed to, e.g., receive a user input requesting that the vehicle 105 operates in the partially autonomous mode, receive inputs from the user 190 to select a destination for the vehicle 105, etc. The vehicle user interface 125 may present information to a vehicle occupant, e.g., a driver, in the form of alerts that may include audible alerts, visual alerts, haptic alerts, etc. Additionally, or in the alternative, the vehicle user interface 125 may present mobile device 110 information to the occupant via the display screen. For example, the computer 130 may output a location of the mobile device 110 to the vehicle 105 user interface, and the display screen may present the mobile device 110 location to the occupant by overlaying the location onto a virtual map of the vicinity. As another example, the computer 130 may output to the display screen a path, i.e., a route, to the mobile device 110 location, and the path can be overlaid onto the virtual map. In some examples, the vehicle user interface 125 includes a display of a mobile device used by the occupant that is communicatively coupled to, i.e., exchanges RF communications with, the computer 130 e.g., via BLUETOOTH, Wi-Fi, etc.

The computer 130 includes a processor and a memory. The memory includes one or more types of computer-readable media, and stores instructions executable by the processor for performing various operations, including as disclosed herein. The memory may store data collected by the sensors 120 such as image data captured by the camera sensors 120. The instructions and data stored in the memory may be accessible to the computer 130 and possible other components of the vehicle 105. The computer 130 is configured, i.e., could include hardware and software, for communications on the vehicle communication network 135. The computer 130 may transmit messages to various devices in a vehicle 105 and receive messages from the various devices, e.g., controllers, actuators, sensors, etc., including the vehicle lights 115, the sensors 120, and the vehicle user interface 125. In addition, or in the alternative, in cases where the computer 130 actually comprises multiple devices, the vehicle communication network 135 or the like may be used for communications between devices represented as the computer 130 in this disclosure. In addition, the computer 130 may be configured for communicating with other devices via various wired and/or wireless networking technologies, e.g., cellular, BLUETOOTH, a universal serial bus (USB), wired and/or wireless packet networks, etc. As described below, the computer 130 is also configured for wireless communication between the vehicle 105, the mobile device 110 and a remote server 170, e.g., via cellular, BLUETOOTH, BLUETOOTH LE, Wi-Fi, etc.

The computer 130 is programmed to receive data from the remote server 170 indicating, e.g., that a passenger user device has requested a ride. The data may include an identifier of the mobile device 110, e.g., a digital key, an identification number, a user identifier, etc. The ride request from the mobile device 110 typically includes a device 110 identifier; the remote server 170, upon receiving the ride request from the mobile device 110, may then include the identifier in the data transmitted to the computer 130. The computer 130 may be programmed to generate a first light pattern 140, e.g., by encoding the received identifier. The computer 130 may be further programmed to actuate the vehicle light 115 in accordance with the first light pattern 140 by outputting the first light pattern 140 to the vehicle light 115. In other words, the vehicle light 115 may be commanded on and off in accordance with the first light pattern 140 via the first light pattern 140 outputted by the computer 130. As discussed further below, the mobile device 110 is typically programmed with a same encoding/decoding scheme for light patterns 140, 145 whereby the mobile device 110 can decode the first light pattern 140 and determine that its encoded identifier has been received.

Various encoding scheme are possible. As one example, the identifier may be an alphanumeric string that can be represented in Morse code. In an example simplified for purposes of illustration, an identifier with value of, e.g., "5," is presented in Morse code as five dots, and would be so encoded and then emitted as a light pattern 140 of five light pulses. More specifically the first light pattern 140 could include five light pulses with an "on" duration of one time unit (e.g., 50 milliseconds), one unit of "off" time between each of the five light pulses, and three units of "off" time after the fifth light pulse and before beginning the next five light pulses. Alternatively or additionally, encoding may also use more than one color channel of light. Camera sensors typically have 3 or more color sensors and white LED light sources sometimes use independent red, green and blue emitters to produce white. Used independently, these color channels can transmit and receive 3 times as much information in the same period of time.

A unit time value may be stored in the memory of the computer 130 and/or in a memory of the remote server 170. The unit time value may vary according to vehicle parameters and or environmental parameters. The memory of the computer 130 and/or the memory of the remote server 170 may store data, e.g., in a lookup table or the like, with which the computer 130 can dynamically determine, e.g., at a time when a light pattern is needed, the unit time value. For example, a greater unit time value could be used for the vehicle lights 115 with slower turn on/off times, e.g., filament-type incandescent bulbs as compared to light emitting diodes. A vehicle light 115 type and/or a factor for adjusting the unit time value can be stored in the memory of the computer 130. As another example, the computer 130 may update the unit time value based on data received by the computer 130 from environmental sensors 120, such as ambient light sensors 120, rain sensing sensors 120, etc. In this example, the presence of rain would increase the time unit value by a stored factor, the stored factor possibly further varying for a detected intensity of rain. As yet another example, a number of light pulses per light pattern may vary from one identifier to the next, and the computer 130 may be programmed to update the unit time value so that a particular number of light patterns can occur per minute, e.g., 20 patterns per minute. The identifier may be any suitable value that can be encoded by the computer 130 into a light pattern of a sequence of light pulses of fixed or variable time durations.

The computer 130 may be programmed to output the first light pattern 140 upon detecting one or more predetermined conditions, e.g., that a distance between the vehicle 105 and the mobile device 110 is below a predetermined threshold. For example, the computer 130 may be programmed to determine a distance from the vehicle 105 to the mobile device 110 associated with the received device 110 identifier. For example, the computer 130 may receive periodic updates of the distance between the vehicle 105 and the mobile device 110 from the remote server 170. Alternatively, for example, the computer 130 may receive periodic updates of the location of the mobile device 110 from the remote server 170 and/or directly, i.e., via RF communications using WiFi, BLUETOOTH, or the like, from the mobile device 110, and calculate the distance between the vehicle 105 and the mobile device 110 in a known manner.

Upon determining that the distance between the vehicle 105 and the mobile device 110 is less than a predetermined threshold, the computer 130 may be programmed to output the first light pattern 140. The predetermined threshold may be a distance value stored in the memory of the computer 130 and/or received from the memory of the remote server 170, and may represent a predetermined radius in which the vehicle 105 and the mobile device 110 can begin identification of each other, e.g., 100 meters. The predetermined threshold distance value may be based on, e.g., environmental conditions. The computer 130 and/or the remote server 170 may store data, e.g., in a lookup table or the like, that associates the predetermined threshold values to different values for ambient light, precipitation, smog, population density at the location of the mobile device 110, etc. The computer 130 may update the predetermined threshold value accordingly depending on data received from the sensors 120. For example, the computer 130 may update the predetermined threshold value depending on data received from ambient light sensors 120, rain sensing sensors 120, etc. Further for example, sensor 120 data could include weather forecasts, smog alerts, etc., and the computer 130 could use the mobile device 110 location correlated with the forecast/alert to update the predetermined threshold. The predetermined threshold value may also be updated manually by the occupant via the vehicle user interface 125.

Alternatively, the computer may be programmed to receive a message indicating a desired pickup location from the remote server 170 and/or the mobile device 110. The desired pickup location may be included in the ride request from the mobile device 110. The computer 130 may be programmed to output the first light pattern 140 upon determining that the vehicle is in a proximity of the pickup location, e.g., 100 meters. The computer 130 may determine the distance between the vehicle 105 and the mobile device 110 in a manner described above.

After the computer 130 actuates the vehicle light 115 in accordance with the first light pattern 140, the computer 130 may be programmed to identify, from image data received by the camera sensors 120, a light pattern emitted from outside the vehicle 105, i.e., transmitted by a mobile device light 160 source. The computer 130 may identify a stored light pattern such as a second light pattern 145 from the image data using known image recognition techniques. The computer 130 may receive a message from the remote server 170 indicating an expected direction the mobile device 110 may be facing with respect to the vehicle 105 as to facilitate the identification of the second light pattern 145. The computer 130 may be programmed to send a confirmation to the remote server 170 that the second light pattern 145 could not be identified, e.g., after a predetermined time-out period, e.g., fifteen minutes, thirty minutes, etc., or after a maximum number of second light pattern 145 recognition attempts, e.g., 10, 20, etc. The time-out period value and the maximum number of attempts value may be stored in the computer 130 memory.

Once the computer 130 identifies the second light pattern 145, i.e., identifies the mobile device light 160 source, the computer 130 may be programmed to determine the mobile device 110 location based on the identified second light pattern 145. The computer 130 may determine the mobile device 110 location, e.g., the distance and relative direction of the mobile device 110 with respect to the camera sensors 120, from the image data using known image recognition techniques. The mobile device 110 location may be stored in the memory of the computer 130 and updated when the location changes. The computer 130 may be further programmed to output the mobile device 110 location to the vehicle user interface 125.

The computer 130 may be programmed to actuate at least one vehicle 105 component upon identifying the second light pattern 145. Once the computer 130 identifies the second light pattern 145, the computer 130 may, for example, command one or more vehicle 105 doors to unlock. As another example, the vehicle 105 horn and/or interior lights may receive commands from the computer 130 to present an audible and/or visual output to the occupant signifying that the mobile device 110 has been identified. The actuation of any vehicle 105 component may be dependent on the mobile device 110 location, e.g., the computer 130 may not output the door unlock command until the prospective user 190 is detected by one or more sensors 120. The computer 130 may be further programmed to transmit a message to the remote server 170 indicating that the mobile device 110 has been identified and located. Further, the computer 130 may be programmed to transmit a message to the remote server 170 indicating that the user 190 is entering or is seated in the vehicle 105, e.g., when the distance between camera sensors 120 and the mobile device 110 is within a minimum distance, e.g., 1 meter, the computer receives an output from a seat sensor indicating the seat sensor has been activated, etc.

The computer 130 can be further programmed to determine a path to the mobile device 110 based on the identified second light pattern 145. The computer 130 may determine the path from, e.g., image data, street locations received by the remote server, data from an on-board GPS module via the vehicle communication network 135, etc. Once the path is determined, the computer 130 may output the path to the vehicle user interface 125. Moreover, the computer 130 may be programmed to actuate the vehicle 105 to move based on the path so that the vehicle 105 may move toward the prospective user 190. The computer 130 may do so by outputting a commands actuating vehicle 105 components so as to cause the vehicle 105 to move along the path.

In some instances, the path may be a specification that the vehicle 105 is to remain where it is to await the user 190. For example, the mobile device 110 could be in an area that can be accessed only by pedestrians. Further, the computer 130 may determine that it is more efficient for the vehicle 105 to remain stationary and let the prospective user 190 come to the vehicle 105, e.g., in a downtown setting with various one-way streets which may cause the vehicle 105 to move away from the user 190, at an airport, etc. The computer 105 may receive the path from the remote server 170 and/or directly from the mobile device 110.

The computer 130 may be programmed to output commands to various actuators. The commands that control the actuators allow the computer 130 to control the steering, braking, and acceleration of the vehicle 105. Various vehicle sensors 120 provide input to the vehicle 105 computer 130, including, e.g., lidar sensors, radar sensors, vision sensors (cameras), ultrasonic sensors, or the like. Each actuator is controlled by control commands, e.g., received from the computer 130 via the vehicle communications network 135. Electrical control commands output by the vehicle 105 may be converted into mechanical motion by the actuator. Examples of actuators may include a linear actuator, a servo motor, or the like.

The mobile device 110 can include a mobile camera 150, the mobile device light 155, a display 160 such as a touchscreen display, and a processor and a memory. The mobile device light 155, e.g., a camera flash, is implemented via one or more light emitting diodes or other light source. The mobile camera 150 may capture still or moving images that comprise pixel data when activated by the mobile computing device 110. The memory includes one or more types of computer-readable media, and stores instructions executable by the processor for performing various operations, including as disclosed herein. The mobile computing device 110 is configured for wireless, e.g., RF, communication between the vehicle 105 and the remote server 170, e.g., via cellular, BLUETOOTH, Wi-Fi, etc.

The mobile computing device 110 is programmed to receive data from the remote server 170 indicating, e.g., that the vehicle 105 has acknowledged the ride request. The data may include a vehicle identifier of the vehicle 105, e.g., vehicle identification number (VIN), identifier for the computer 130, etc. The ride request acknowledgement transmission from the vehicle 105 may include a vehicle 105 identifier, or the remote server 170 may transmit a message to the vehicle 105 requesting the vehicle 105 identifier. The remote server 170, upon receiving the ride request acknowledgement or the vehicle 105 identifier in response to the message, may then include the vehicle identifier in the data transmitted to the mobile device 110. The mobile computing device 110 may be programmed to generate the second light pattern 145 based on the received vehicle identifier, e.g., by encoding as described above. The mobile computing device 110 may be further programmed to actuate, i.e., to command on and off, the mobile device light 155 in accordance with the second light pattern 145 by continuously outputting the second light pattern 145 to the mobile device light 155.

In addition or as an alternative to encoding identifiers as described herein to generate light patterns 140, 145, other bases for providing light patterns could be used. For example, the device 110 could generate its own, rather than the vehicle 105, identifier, for recognition by the vehicle 105, and vice-versa. Further, light patterns 140, 145 need not be based on device identifiers, e.g., mobile device 110 and/or vehicle 105 identifiers, at all. Instead, for example, light patterns 140, 145 could be stored in look-up tables or the like in the server 170, mobile device 110, and/or vehicle 105 computer 130. The server 170 could specify one or more light pattern 140, 145 identifiers to the mobile device 110 and computer 130 to respectively send and/or receive. The device 110 and/or computer 130 could then retrieve a stored light pattern 140 and/or 145 according to (a) received light pattern 140, 145 identifier(s).

The mobile computing device 110 may be programmed to output the second light pattern 145 upon detecting one or more predetermined conditions. For example, the mobile computing device 110 may be programmed to determine a distance between the mobile device 110 and the vehicle 105 by, e.g., receiving periodic updates of the distance from the remote server 170, receiving periodic updates of the location of the vehicle 105 from the remote server 170 and/or directly from the computer 130 and calculating the distance in a known manner, etc. Upon determining that the distance between the mobile device 110 and the vehicle 105 is less than a predetermined threshold, the mobile computing device 110 may be programmed to output the second light pattern 145 to the mobile device light 155. The predetermined threshold associated with the mobile computing device 110 may be a distance value stored in the memory of the mobile computing device 110 or received from the memory of the remote server 170, and may be different than the predetermined threshold associated with the computer 130. The predetermined threshold associated with the mobile computing device 110 may be updated by the mobile computing device 110, the remote server 170, and/or the prospective user 190 via the display 160 of the mobile device 110 in a manner described above. The predetermined threshold value may be updated based on, e.g., ambient light conditions detected by the mobile device 110, weather reports received by the mobile device 110 via wireless communication with the remote server 170 and/or other RF broadcasting sources, etc.

After the mobile computing device 110 actuates the mobile device light 155 in accordance to the second light pattern 145, the mobile computing device 110 may be programmed to identify, from image data received by the mobile camera 150, the first light pattern 140 emitted from the vehicle light 115 of the vehicle 105. The mobile computing device 110 may identify the first light pattern 140 from the image data using known image recognition techniques. The mobile computing device 110 may receive a message from the remote server 170 indicating an expected direction the vehicle 105 may be facing with respect to the mobile device 110 as to facilitate identification of the first light pattern 140. The mobile computing device 110 may be programmed to send a confirmation to the remote server 170 that the first light pattern 140 could not be identified, e.g., after a predetermined time-out period, e.g., fifteen minutes, thirty minutes, etc., or after a maximum number of first light pattern 140 recognition attempts, e.g., 10, 20, etc. The time-out period value and the maximum number of attempts value may be stored in the mobile computing device 110 memory.

Once the mobile computing device 110 identifies the first light pattern 140, the mobile computing device 110 may be programmed to determine a location of the vehicle 105 based on the identified first light pattern 140. The mobile computing device 110 may determine the vehicle 105 location, e.g., the distance and relative direction of the vehicle 105 with respect to the mobile device 110, from the image data using known image recognition techniques. The vehicle 105 location may be stored in the memory of the mobile computing device 110 and updated when the location changes. The mobile computing device 110 may be further programmed to output the vehicle 105 location to the display 160. The mobile computing device 110 may be further programmed to transmit a message to the remote server 170 indicating that the vehicle 105 has been identified and located. Further, the mobile computing device 110 may be programmed to transmit a message to the remote server 170 indicating that the user 190 is entering the vehicle 105, e.g., when the distance between the vehicle 105 and the mobile computing device 110 is within a minimum distance, e.g., 1 meter. As described further below, the mobile computing device 110 may be programmed to, e.g., display, highlight, zoom in on, etc., the vehicle 105 in the display 160 based on the identification of the first light pattern 140 so that the prospective user 190 may head toward the vehicle 105.

The mobile computing device 110 can be further programmed to determine a path to the vehicle 105 based on the identified first light pattern 140. The mobile computing device 110 may determine the path based on, e.g., image data from the mobile camera 150, data from the remote server 170, a GPS module on-board the mobile device 110, etc. For example, using the vehicle 105 location as determined in the manner described above, the mobile computing device 110 may transmit the vehicle 105 location as a destination to a map application, e.g., Google Maps™ or the like, running on the mobile computing device 110 to determine the path to the vehicle 105. Once the path is determined, the mobile computing device 110 may output the path to the display 160, and/or transmit the path directly to the computer 130. Alternatively, the mobile computing device 110 may receive the path to the vehicle 105 from the remote server 170 and/or directly from the computer 130. The mobile computing device 110 may be programmed to transmit a message to the computer 130 requesting that the vehicle 105 remain stationary, e.g., when the mobile computing device 110 determines that the vehicle 105 is heading away from the mobile device 110, when the prospective user 190 via the display 160 requests the vehicle 105 to remain stationary, etc.

Additionally, or in the alternative, the data received by the mobile computing device 110 from the remote server 170 may include data describing the vehicle 105, e.g., vehicle 105 color, make, model, etc., that may assist the mobile computing device 110 in identifying the vehicle 105. The image recognition techniques used by the mobile computing device 110 may use the data describing the vehicle 105 to filter the image data received by the mobile camera 150 to narrow the search for the first light pattern 140 to vehicles matching the description criteria. For example, if the vehicle 105 is green as described in the vehicle identifier, the mobile computing device 110 may subtract all vehicles that are not green from the image data to reduce the amount of image data needed to be analyzed for first light pattern 140 recognition. This "pre-processing" filtering may allow the image recognition techniques to preliminarily identify the vehicle 105, and upon identifying the vehicle 105, identify the first light pattern 140. The filtering may reduce a time needed for first light pattern 140 identification. The data describing the vehicle 105 may be received by the remote server 170 from the vehicle 105, e.g., included in the ride request acknowledgment, and the data describing the vehicle 105 may be transmitted with the vehicle identifier to the mobile computing device 110.

The remote server 170 is a computer including a processor and a memory, the memory stores instructions which may be executed by the processor. The remote server 170 can communicate, via the network 175 with the computer 130 of the vehicle 105 and the mobile computing device 110.

The remote server 170 may be programmed to receive data relating to the ride request from the mobile computing device 110, and the ride request acknowledgement from the computer 130. The remote server 170 may store the data in the memory associated with the remote server 170. The remote server 170 may be programmed to identify an available vehicle to service the mobile computing device 110 ride request, e.g., by locating the nearest available vehicle to the mobile computing device 110 from GPS data received from available vehicles and the mobile computing device 110. The remote server 170 may be programmed to transmit a message to the vehicle 105 indicating that the vehicle 105 respond with the ride request acknowledgement. The remote server 170 may be programmed to generate the identifier as a result of receiving the ride request from the mobile device 110, and transmit the identifier to the computer 130. The remote server 170 may be programmed to generate the vehicle identifier as a result of receiving the ride request acknowledgement from the vehicle 105, and transmit the vehicle identifier to the mobile computing device 110. The remote server 170 may receive messages from each of the mobile computing device 110 and the computer 130 indicating that the vehicle 105 and/or the mobile device 110 has been identified, the mobile device 110 has been located, the user 190 is entering the vehicle 105, and/or the user 190 is seated in the vehicle 105. The remote server 170 may be programmed to receive location data from each of the mobile computing device 110 and the computer 130, and transmit the respective location of the other party and/or distance the between the parties to each of the mobile computing device 110 and the computer 130. The remote server 170 may be programmed to transmit to each of the mobile computing device 110 and the computer 130 the expected relative direction the parties are facing relative to each other based on receiving the location data.

The network 175 represents one or more mechanisms by which the vehicle 105, the mobile device 110 and the remote server 170 may communicate with each other. The network 175 may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, BLUETOOTH, IEEE 802.11, etc.), local area networks (LAN) and/or wide area networks (WAN), including the Internet, providing data communication services.

The types of wireless communications may include one or more of cellular, BLUETOOTH, IEEE 802.11 (typically, Wi-Fi), dedicated short range communications (DSRC), two-way satellite (e.g., emergency services), one-way satellite (e.g., receiving digital audio radio broadcasts), AM/FM radio, etc.

The exemplary system 100 can act independently of any other identification and authentication methods. The exemplary system 100 can also act as a complementary method to other existing identification and authentication methods, e.g., RF communications via BLUETOOTH, Cellular (e.g., texts and/or phone calls between the mobile device 110 and the occupant of the vehicle 105), GPS, visible flashing light (e.g., strobe light), visible display unit in the vehicle 105, etc.

Figure 2:
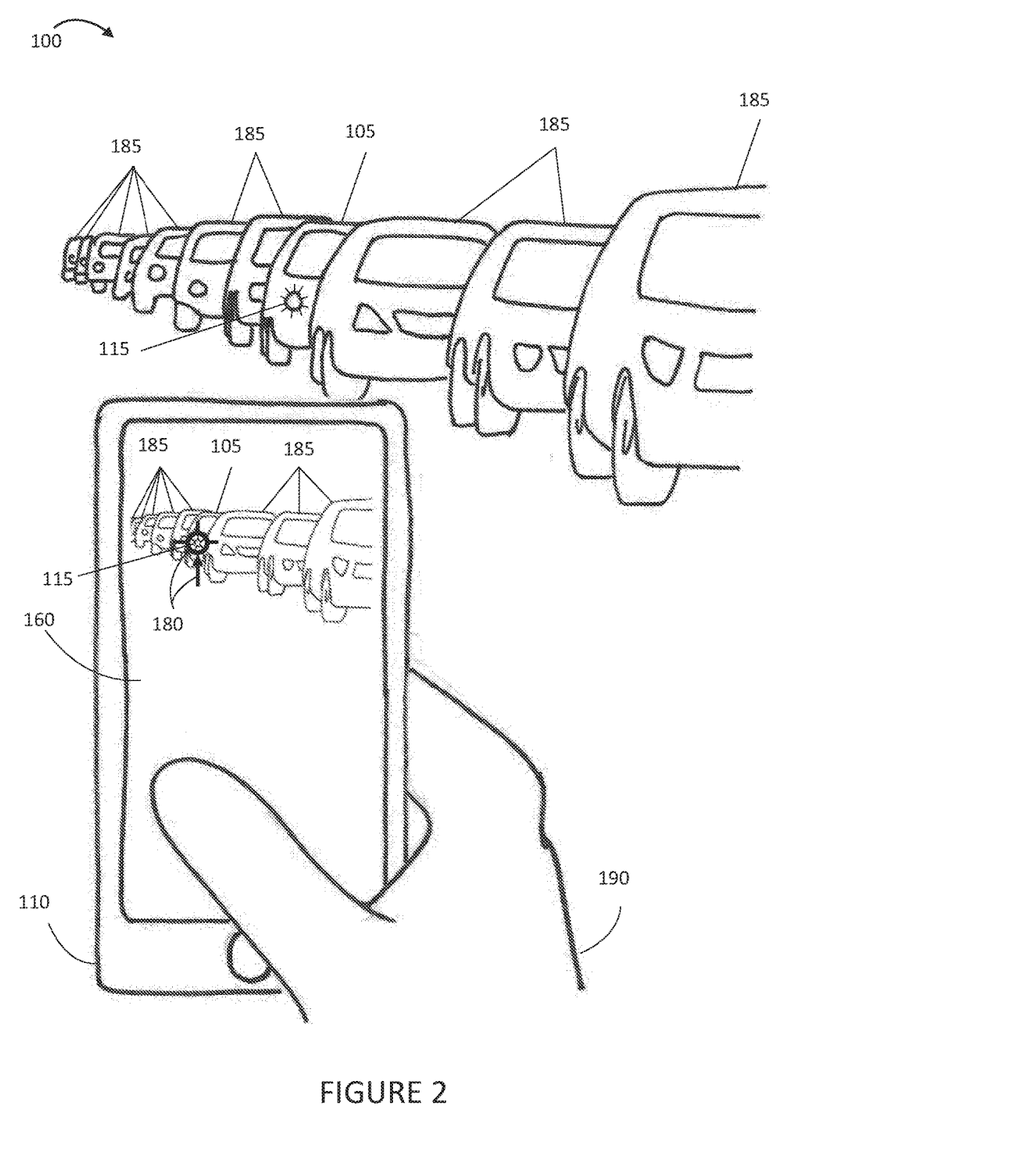
FIG. 2 is a perspective view of the mobile device identifying the vehicle in a display of the mobile device

FIG. 2 illustrates a view of the display 160 from the vantage point of the prospective user 190 after the mobile computing device 110 has identified the first light pattern 140 emitted from the vehicle light 115. The vehicle 105 associated with the first light pattern 140 may be, e.g., parked in a row, e.g., at an airport arrival gate, moving along a street, etc., with other vehicles 185. Once the first light pattern 140 is identified, the mobile computing device 110 may be programmed to identify the vehicle 105 in the display 160. For example, the mobile computing device may overlay a marker 180 onto the vehicle light 115 in the display 160, as shown in FIG. 2. Other examples may include the mobile computing device 110 overlaying the marker 180 onto the entire vehicle 105, zooming in on the vehicle 105, highlighting the vehicle 105, placing a hovering caption on the vehicle 105, etc.

Exemplary Process Flows

Figure 3:
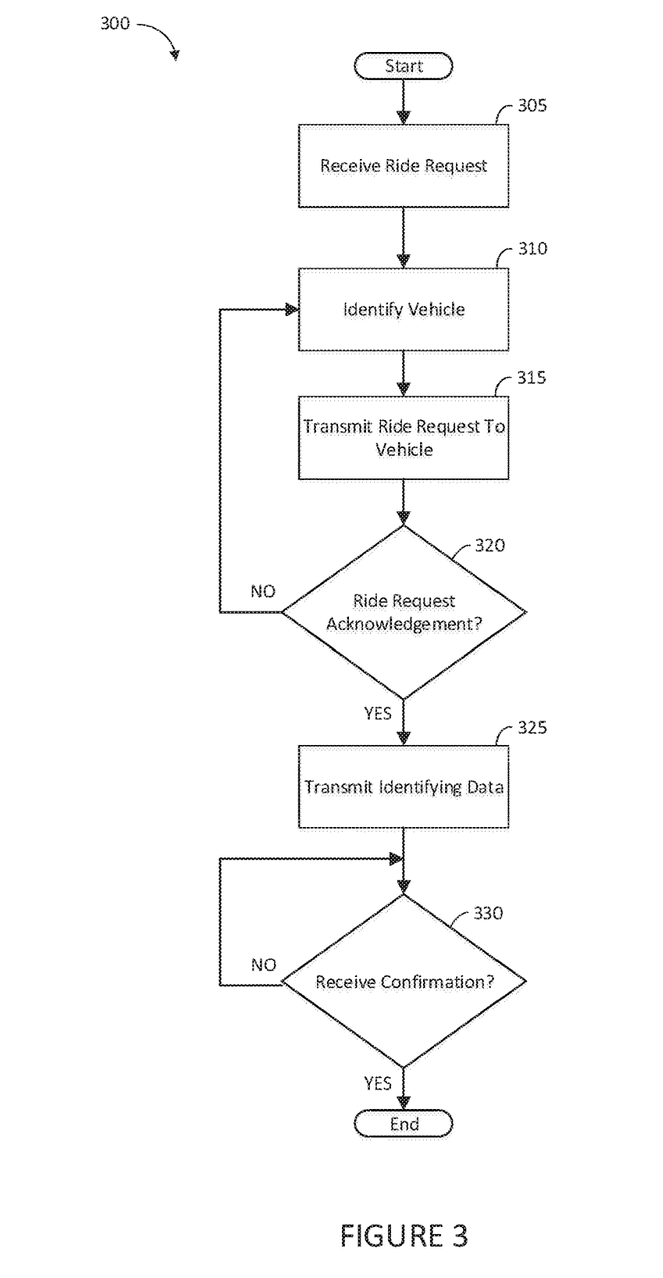
FIG. 3 is flowchart of an example process for FIG. 4 is another flowchart of an example process for FIG. 5 is a flowchart for an exemplary process for a mobile computing device to perform light-based communication with a vehicle computer.

FIG. 3 is a flowchart of an exemplary process 300 for initiating light-based communication between the vehicle 105 and the mobile device 110. The process 300 starts in a block 305. As described below, various steps of the process 300 may be executed by the remote server 170, i.e., by a processor the server 170 according to program instructions stored in the memory of the server 170, in conjunction with the devices 110, 130 as described below.

In the block 305, the remote server 170 processor receives the ride request from the mobile computing device 110. For example, the prospective user 190 may provide input to the mobile computing device 110 specifying a ride request for transportation services. The ride request transmitted to the server 170 includes the identifier of the mobile device 110, as well as information specifying ride parameters such as a destination, a requested pickup time, a pickup location (or a device 110 location to be used as the pickup location), etc. Upon receiving the ride request, the process 300 continues in a block 310.

Next, in the block 310, the remote server 170 identifies an available vehicle to service the mobile computing device 110 ride request. For example, the remote server 170 processor may monitor the locations of available vehicles used by the transportation service, e.g., by receiving periodic GPS location data from the available vehicles, and identifying vehicles within a predetermined distance of a requested pickup location. A closest vehicle e.g., in distance or according to a travel time, may be identified. Once the vehicle 105 has been identified, the process 300 continues in a block 315.

Next, in the block 315, the remote server 170 transmits a ride request message, e.g., including information provided in the ride request as described above to the vehicle 105 computer 130 indicating the vehicle 105 was identified to service a ride request, and requests acknowledgement from the computer 300. Upon transmitting the ride request, the process 300 continues in a block 320.

Next, in a block 320, the remote server 170 determines whether the ride request acknowledgment described in the previous paragraph has been received. For example, the initially identified vehicle 105 could decline the ride request, or might for some reason not have received it, whereupon the process 300 would return to the block 310, and whereupon another vehicle 105 could be identified and provided with the ride request. In any event, if the ride request acknowledgment is not received, e.g., after a predetermined time-out period value stored in the remote server 170 memory, e.g., five seconds, or ten seconds, etc., the process 300 proceeds to the block 310. Otherwise, upon receiving the ride request acknowledgement, the process 300 continues in a block 325.

In the block 325, the remote server 170 transmits respective data to each of the vehicle 105 computer 130 and the mobile computing device 110 by which the computers 110, 130 can identify each other. The server 170 may include the identifier received from ride request from the mobile computing device 110 in the identifying data transmitted to the vehicle 105 computer 130.

Further, the remote server 170 may receive the vehicle 105 identifier and data describing the vehicle 105, e.g., a make, model, model year, color, etc., in the computer 130 ride request acknowledgment. Alternatively, the processor may transmit a message to the computer 130 requesting the vehicle identifier and data describing the vehicle 105. Yet further alternatively or additionally, such data could be stored in the server 170 and associated with a vehicle 105 identifier. The remote server 170 processor may include the vehicle identifier and the data describing the vehicle 105 in the identifying data transmitted to the mobile computing device 110.

Next, in a block 330, the remote server 170 processor determines whether a confirmation of the user 190 entering the vehicle has been received from one or both of the vehicle 105 computer 300 and the mobile computing device 110. Further processing regarding the device 110 and the computer 130 actuating light patterns, as described above, to support the user 190 and the vehicle 105 finding one another and completing the pickup, is described below with respect to FIGS. 4 and 5.

Further, although not shown in FIG. 3, the process 300 may end via a ride cancellation in certain instances. For example, the driver and/or the user 190 may provide input indicating to terminate the transportation service run. In this event, the remote server 170 may receive a confirmation of a ride cancellation from the computer 130 and/or the mobile computing device 110.

Further, the process 300 could be terminated if no confirmation is received within a predetermined time-out period value stored in the remote server 170 memory, e.g., fifteen minutes, thirty minutes, etc. In some implementations, the time-out period value may be reset or modified by the server 170, e.g., if the server 170 determines that the vehicle 105 is stuck in heavy traffic, etc. Otherwise, the process 300 ends.

Figure 4:
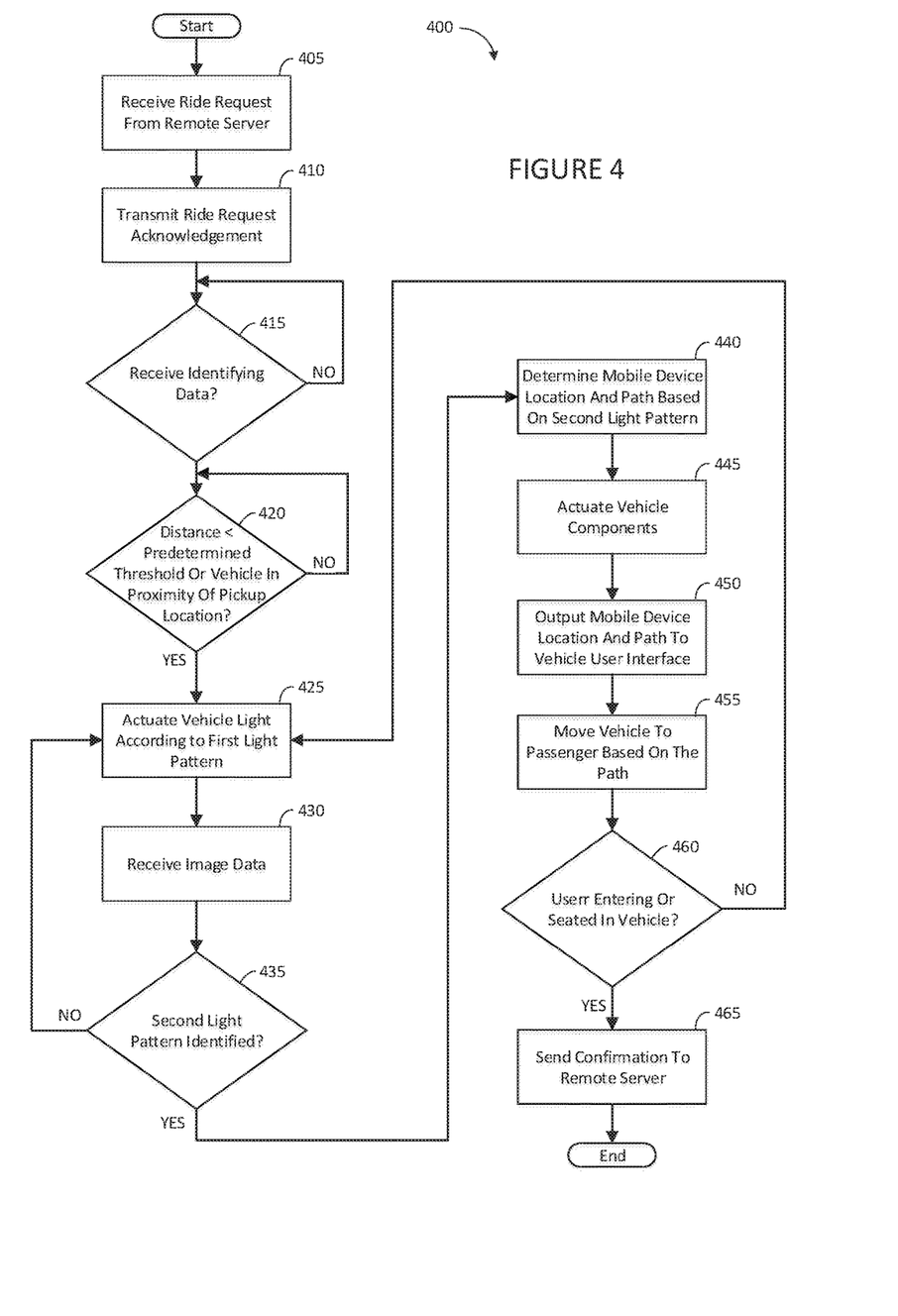

FIG. 4 is flowchart for an exemplary process 400 for the vehicle 105 computer 130 to perform light-based communication with the mobile device 110. The process starts in a block 405.

In the block 405, the vehicle 105 computer 130 receives the ride request, e.g., including information provided by the mobile device 110 ride request as described above, from the remote server 170. As also described above, the remote server 170 may request an acknowledgment; alternatively or additionally the computer 130 could be programmed to provide the acknowledgement upon receiving the request and/or determining to fulfill it.

Next, in a block 410, the computer 130 transmits the ride request acknowledgment, e.g., including the vehicle 105 identifier and data describing the vehicle 105 in the ride request acknowledgment, to the remote server 170. Further, if either a human driver or the computer 130 determines that the vehicle 105 cannot fulfill the ride request, e.g., because the vehicle needs maintenance, fuel, etc., a driving shift is over or close to over, etc., a message declining the request could be sent, and the process 400 would then end (although not shown in FIG. 4). Upon transmitting the ride request acknowledgment, the process 400 continues in a block 415.

Next, in the block 415, the computer 130 determines whether the identifying data, e.g., including the mobile device 110 identifier of the mobile device 110 from which the ride request was sent, has been received. The process 400 continues to execute the block 415 until the identifying data has been received, or a predetermined time-out period value stored in the computer 130 memory has been exceeded, e.g., five seconds, ten seconds, etc. If the identifying data is received, the process 400 continues in a block 420. Otherwise, the computer 130 may transmit a message to the remote server 170 requesting the identifying data and reset the time-out period value, or transmit a confirmation message to the remote server 170 indicating the ride is cancelled, whereupon the process 400 ends.

Next, in the block 420, the computer 130 determines whether the vehicle 105 is within the predetermined distance (discussed above) of the pickup location as the vehicle 105 moves toward the pickup location. The computer 130 may receive ride parameters as described above, e.g., in the ride request transmitted by remote server 170 in the block 405. The computer 130 determines the distance between the vehicle 105 and the mobile device 110 as described above.

The process 400 typically continues to execute the block 420 until the vehicle 105 is within the predetermined distance of the pickup location, or a predetermined time-out period stored in the computer 130 memory and/or the remote server 170 memory has been exceeded. The time-out value, e.g., fifteen minutes, thirty minutes, etc., may be modified by the computer 130 and/or the remote server 170 based on, e.g., traffic conditions, etc. If the threshold or proximity condition is met, the process 400 continues to a block 425. Otherwise, the computer 130 may transmit a confirmation message to the remote server 170 indicating the ride is cancelled and the process 400 ends.

Next, in the block 425, the computer 130 outputs the first light pattern 140 via the vehicle light 115, e.g., by encoding a received identifier, as described above.

Next, in a block 430, the camera sensors 120 capture light patterns emitted from the outside of the vehicle 105 in the manner described above. The camera sensors 120 output the image data, e.g., frames from a stream of digital video data, to the computer 130, e.g., via the vehicle communications network 135.

Next, in a block 435, the computer 130 stores the image data in the computer 130 memory. Thereafter, the computer 130 attempts to identify a light pattern such as the second light pattern 145, in the manner described above, and may receive a message from the remote server 170 indicating the expected direction the mobile device 110 is facing relative to the vehicle 105 to facilitate the second light pattern 145 identification. If the computer 130 identifies the second light pattern, the process 400 continues in a block 440. Otherwise, the process 400 returns to the block 425 so that the computer 130 can continue to output the first light pattern 140 and capture new image data.

Next, in the block 440, the computer 130 determines the location, i.e., the distance and a direction, of the mobile device 110 relative to the vehicle 105, as well as the path to the mobile device 110 based on the image data of the second light pattern 145, as described above. The distance and direction of the device 110 with respect to the vehicle 105 may be determined using conventional GPS data, e.g., GPS coordinates of the vehicle 105 and device 110 can be compared to each other to provide an absolute distance, e.g., in meters, as well as a compass direction of the device 110 with respect to the vehicle. The computer 130 may store the relative location and the path in the computer 130 memory. The computer 130 may output the relative location (with respect to the vehicle 105) of the mobile device 110 to the remote server 170.

Next, in a block 445, the computer 130 may actuate vehicle components, e.g., interior lights, horn, door locks, etc., as described above, to alert the user 190 and/or allow entry to the vehicle 105. The computer 130 may determine to actuate the vehicle 105 components based on the location of the mobile device 110, as described above.

Next, in a block 450, the computer 130 may output the mobile device 110 location and/or the path to the vehicle user interface 125, e.g., for navigation purposes by a human driver. This step may be omitted where the vehicle 105 is autonomous or semi-autonomous.

Next, in a block 455, in cases where the computer 130 is operating the vehicle 105 in an autonomous or semi-autonomous mode, the computer 130 may output commands actuating vehicle 105 components causing the vehicle 105 to move along the path toward the mobile device 110. As explained above, the computer 130 may command the vehicle 105 to remain stationary so that the user 190 may come to the vehicle 105.

Next, in a block 460, the computer 130 determines whether the user 190 is entering or is seated in the vehicle 105 based on the location of the mobile device 110 and/or sensor 120 data received by the computer 130, as described above. If the computer 130 determines that the user 190 is entering or seated in the vehicle 105, the process 400 continues in a block 465. Otherwise, the process 400 returns to the block 425 so that the computer can continue to output the first light pattern 140, capture new image data, and update the location of and the path to the mobile device 110 based on image data of the second light pattern 145.

Next, in the block 465, the computer 130 outputs a confirmation message to the remote server 170 indicating that the user 190 is entering or seated in the vehicle 105, whereupon the process 400 ends.

Figure 5:
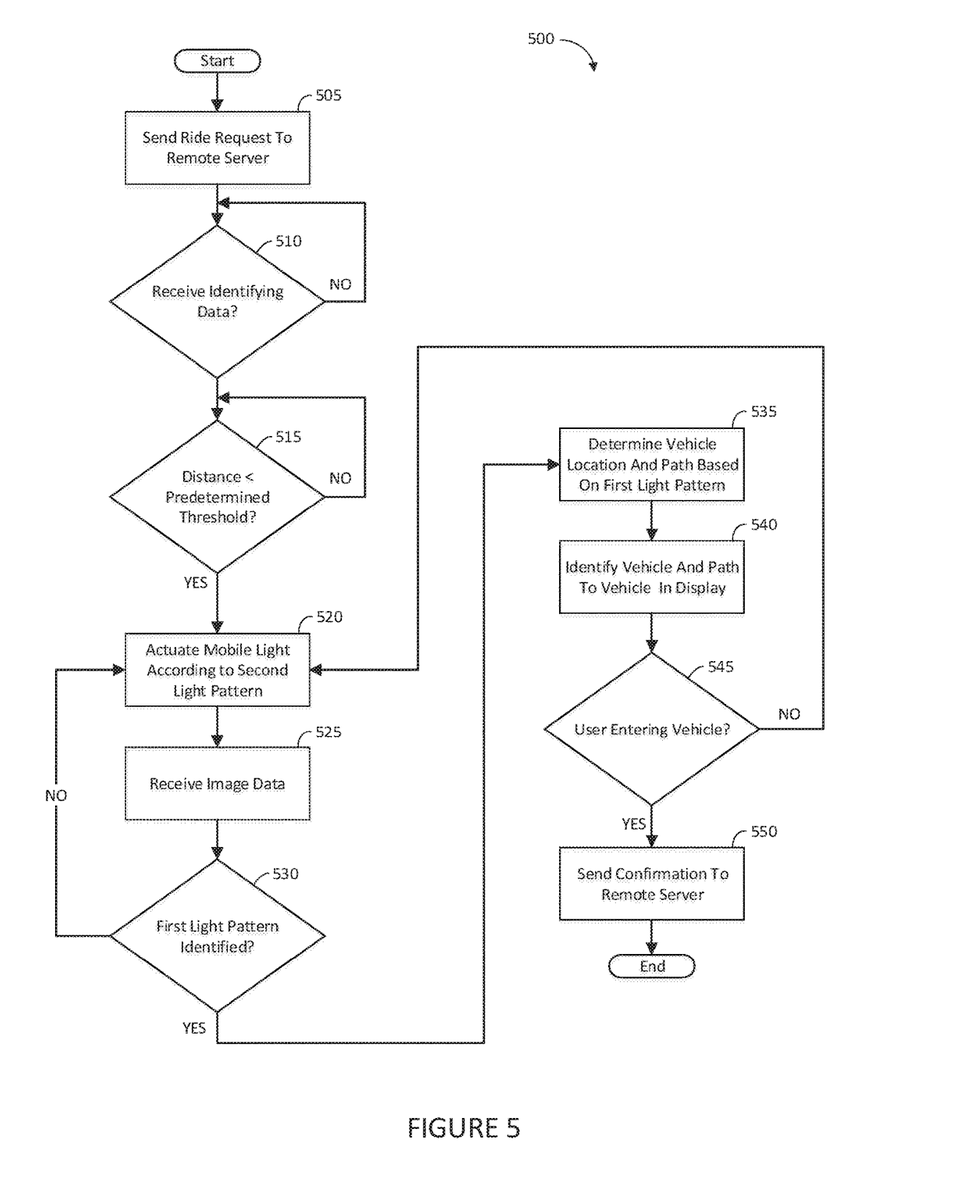

FIG. 5 is a flowchart for an exemplary process 500 for the mobile computing device 110 to perform light-based communication with the vehicle 105 computer 130. The process starts in a block 505.

In the block 505, the mobile computing device 110 transmits the ride request to the remote server 170 to initiate a request for ride transportation services. The ride request includes the identifier of the mobile device 110 and ride parameters, as discussed above.

Next, in the block 510, the mobile computing device 110 determines whether it has received the identifying data, e.g., including the vehicle 105 identifier and data describing the vehicle 105 from the ride request acknowledgment from a vehicle 105 that accepted the ride request. The process 500 continues to execute the block 510 until the identifying data has been received, or a predetermined time-out period value stored in the mobile computing device 110 memory has been exceeded, e.g., five seconds, ten seconds, etc. If the identifying data is received, the process 500 continues in a block 515. Otherwise, the mobile computing device 110 may request the identifying data from the remote server 170 and reset the time-out period value, or transmit a confirmation message to the remote server 170 indicating the ride is cancelled, whereupon the process 500 ends.

Next, in the block 515, the mobile computing device 110 determines whether the mobile device 110 is within the predetermined distance (discussed above) of the approaching vehicle 105. The mobile computing device 110 determines the distance between the mobile device 110 and the vehicle 105, as described above, to make the determination of whether the vehicle 105 is within the predetermined distance.

Next, in a block 520, the mobile computing device 110 outputs the second light pattern 145 via the mobile device light 155, e.g., by encoding a received vehicle identifier, as described above.

Next, in a block 525, the mobile camera 150 captures light patterns images, e.g., frames from a stream of digital video data, from the vehicle 105, which are stored in the memory of the mobile computing device 110.

Next, in the block 530, the mobile computing device 110 attempts to identify the first light pattern 140 in the manner described above. The mobile computing device 110 may receive a message from the remote server 170 specifying an expected direction from which the vehicle 105 is approaching relative to the mobile device 110 to facilitate identifying a vehicle 105 first light pattern 140. Further, as discussed above, the device 110 may filter image data to preliminarily identify, i.e., predict, a vehicle 105 expected to provide the first light pattern 140, e.g., using image analysis techniques to identify visual vehicle 105 attributes, e.g., a make, model, color, and/or other features specified in a message from the server 170. If the mobile computing device 110 identifies the first light pattern, the process 500 continues in a block 535. Otherwise, the process 500 returns to the block 520 so that the mobile computing device 110 can continue to output the second light pattern 145 and capture new image data.

Next, in the block 535, the mobile computing device 110 determines the location, i.e., the distance and the direction, of the vehicle 105 relative to the mobile device 110, as well as the path to the vehicle 105 based on the image data of the first light pattern 140, as described above. The mobile computing device 110 may store the location and the path in the mobile computing device 110 memory. As explained above, the distance and direction of the device 110 with respect to the vehicle 105 may be determined using conventional GPS data, e.g., GPS coordinates of the vehicle 105 and device 110 can be compared to each other to provide an absolute distance, e.g., in meters, as well as a compass direction of the device 110 with respect to the vehicle Next, in a block 540, the mobile computing device 110 may provide the vehicle 105 and/or the path in the display 160 of the mobile device 110, e.g., as shown in FIG. 2, and described above, to assist the prospective user 190 in identifying the vehicle 105.

Next, in a block 545, the mobile computing device 110 determines whether the user 190 is entering the vehicle 105 based on the location of the vehicle 105, as described above. If the mobile computing device 110 determines that the user 190 is entering the vehicle 105, e.g., is at a distance where a user 190 typically reaches for the vehicle 105 door, as described above, the process 500 continues in a block 550. Otherwise, the process 500 returns to the block 520 so that the mobile computing device 110 can continue to output the second light pattern 145, capture new image data, and update the location of and the path to the vehicle 105 based on image data of the first light pattern 140.

Next, in the block 550, the mobile computing device 110 outputs a confirmation message to the remote server 170 indicating that the user 190 is entering the vehicle 105, whereupon the process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A system, comprising a computer programmed to:
    generate a first light pattern based on a received identifier;
    actuate a vehicle light according to the first light pattern; and
    then identify, from received image data relating to an area around the vehicle, a second light pattern emitted by a light-generating device outside of the vehicle.

2. The system of claim 1, wherein the computer is further programmed to actuate at least one vehicle component upon identifying the second light pattern.

3. The system of claim 1, wherein the computer is further programmed to:
    determine a mobile device location based on the identified second light pattern; and
    output the mobile device location to a vehicle user interface.

4. The system of claim 1, wherein the computer is further programmed to:
    determine a path to a mobile device based on the identified second light pattern; and
    at least one of output the path to a vehicle user interface and actuate the vehicle to move based on the path.

5. The system of claim 1, wherein the computer is further programmed to:
    determine a distance to a mobile device associated with the identifier; and
    actuate the vehicle light upon determining that the distance is less than a predetermined threshold.

6. The system of claim 1, further comprising a mobile computing device, programmed to:
    generate the second light pattern based on a received vehicle identifier; and
    actuate a mobile device light according to the second light pattern.

7. The system of claim 6, wherein the mobile computing device is further programmed to:
    identify, from received image data, the first light pattern.

8. The system of claim 7, wherein the mobile computing device is further programmed to:
    based on the first light pattern, identify the vehicle in a display of a mobile device.

9. The system of claim 7, wherein the mobile computing device is further programmed to:
    before identifying the first light pattern from the received image data, use the received image data to predict the identity of the vehicle based on visual vehicle attributes.

10. The system of claim 6, wherein the mobile computing device is further programmed to:
    determine a distance to the vehicle; and
    actuate the mobile device light upon determining that the distance to the vehicle is less than a predetermined threshold.

11. A method comprising:
    generating a first light pattern based on a received identifier;
    actuating a vehicle light according to the first light pattern; and
    then identifying, from received image data relating to an area around the vehicle, a second light pattern emitted by a light-generating device outside of the vehicle.

12. The method of claim 11, further comprising actuating at least one vehicle component upon identifying the second light pattern.

13. The method of claim 11, further comprising:
determining a mobile device location based on the identified second light pattern; and
outputting the mobile device location to a vehicle user interface.

14. The method of claim 11, further comprising:
determining a path to a mobile device based on the identified second light pattern; and
at least one of outputting the path to a vehicle user interface and actuating the vehicle to move based on the path.

15. The method of claim 11, further comprising:
determining a distance to a mobile device associated with the identifier; and
actuating the vehicle light upon determining that the distance is less than a predetermined threshold.

16. The method of claim 11, further comprising:
generating the second light pattern based on a received vehicle identifier; and
actuating a mobile device light according to the second light pattern.

17. The method of claim 16, further comprising:
identifying, from received image data, the first light pattern.

18. The method of claim 17, further comprising:
based on the first light pattern, identifying the vehicle in a display of a mobile device, based on the first light pattern.

19. The method of claim 17, further comprising:
before identifying the first light pattern from the received image data, using the received image data to predict the identity of the vehicle based on visual vehicle attributes.

20. The method of claim 16, further comprising:
determining a distance to the vehicle; and
actuating the mobile device light upon determining that the distance to the vehicle is less than a predetermined threshold.

* * * * *